Nov. 20, 1956    F. V. JOHNSON    2,771,258
AIRCRAFT STABILIZING APPARATUS
Filed Jan. 31, 1950
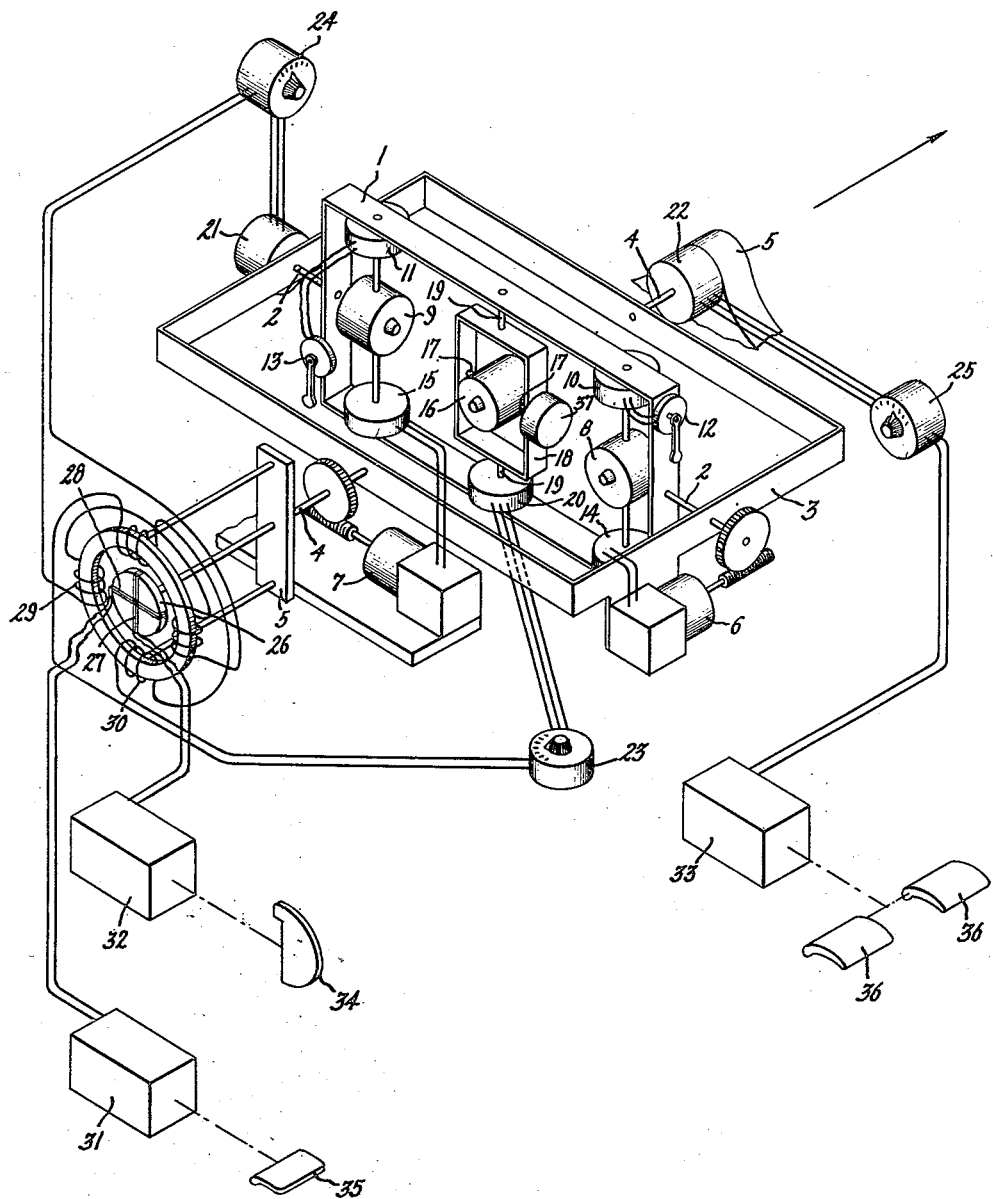
Inventor:
Frithiof V. Johnson,
by Charles W. Mott
His Attorney.

United States Patent Office 2,771,258
Patented Nov. 20, 1956

2,771,258

AIRCRAFT STABILIZING APPARATUS

Frithiof V. Johnson, Scotia, N. Y., assignor to General Electric Company, a corporation of New York Application January 31, 1950, Serial No. 141,493

9 Claims. (Cl. 244—77)

The present invention relates to aircraft control and more particularly to apparatus commonly referred to as an automatic pilot for controlling aircraft in flight.

It is desirable that an automatic pilot be constructed so that it will stabilize the aircraft in curved flight as well as straight and level flights so that precise maneuvering turns may be executed. It is also desirable that the controls be coordinated so that the proper angle of bank will be maintained for a given rate of turn. In curved flight, stabilization of an aircraft raises certain difficult problems which are not encountered in straight and level flight. One very serious problem arises from the fact that the directional and vertical gyroscopes usually used to measure the displacement of the aircraft about the yaw, pitch and bank axes, tend to maintain the orientation of their spin axes fixed in space, while the aircraft rudder, elevator and aileron control surfaces, which are controlled by the gyroscopes, move about axes which are fixed relative to the aircraft. During straight and level flight, the control axes of the aircraft and the gyroscope are parallel and no difficulty arises. However, if the airplane is banked an appreciable amount, as in a turn, the yaw and pitch axes of the aircraft become displaced from the gyroscope axes and as a result the aircraft controls are not operated properly. This problem becomes more and more acute as the angle of bank is increased for high speed maneuvering turns. Thus, when the aircraft approaches a vertical bank, the rudder no longer controls the turn of the airplane but produces either a climb or a dive and the elevator no longer controls the pitch of the airplane but increases or decreases the rate of turn. A conventional automatic pilot would, therefore, control the wrong surfaces under this condition and lose control over the aircraft.

The conventional aircraft is provided with a rudder for controlling movements of the craft in azimuth about its yaw axis, an elevator for controlling movement of the craft about its pitch axis and ailerons for controlling the craft about its bank axis. Conventional automatic pilots are designed to detect deviations of the craft from a predetermined stabilized position about all three of these axes and to supply signals which effect an actuation of the control surfaces of the craft to restore it to the position from which it deviated. Normally, any deviation in azimuth is corrected by movements of the rudder, deviations in pitch by the elevator, and corrections in bank are effected by the ailerons. When the aircraft is in level flight, the rudder and elevator are properly adjusted to correct for deviations in yaw and pitch of the craft, respectively. However, when the aircraft is banked, the division of the functions of these control surfaces as rudder and elevator varies as a sine and cosine function of the angle of bank of the craft. For example, at a bank angle of 90°, the elevator functions solely as a rudder while the rudder functions solely as an elevator.

Although it is essentially true, as stated above, that the division of the functions of the control surfaces varies as a sine and cosine function of the angle of bank of the craft, it does not follow that the signals from the gyroscopic reference units should be resolved in terms of the bank angle before being applied to the control surface servos. This resolution would be proper only if the signals from the gyro reference units represent the deviations of the aircraft from the desired attitude in the true horizontal and vertical planes through the longitudinal axis of the aircraft.

In a system in which the signals from the gyro units represent the deviations from the desired attitude measured in a coordinate system tied to the aircraft, no resolution would be necessary and the gyro signals could be applied directly to the control surface servos.

The directional and vertical gyros carried in aircraft provide an excellent position reference means due to their characteristic gyroscopic property of rigidity. These devices carry transmitters, sometimes referred to in the art as pick-offs, which are connected to the gyro gimbals so as to transmit signals representative of deviations of the craft from level flight and from an azimuth baseline. Thus, departure of the transmitter signal outputs from desired values represent errors in the attitude of the aircraft. It is important to note, however, that these departures do not necessarily represent errors about the control axes of the aircraft.

Heretofore, various attempts have been made to provide a cross control system for aircraft which, in effect, functions to cross the rudder and elevator controls by exchanging the pick-off signals from the vertical gyro and the directional gyro by means of resolvers so that the rudder and elevator servo channels have signals transmitted to them which represent errors about the aircraft control axes. It will be readily appreciated however, that heretofore, the directional gyro pick-off has measured deviation about an axis which tilts as the aircraft banks. Since this gyro provides the only azimuth reference in the true horizontal plane, it will be immediately evident that when the aircraft is banked 90°, the conventionally disposed pick-off does not have necessary orientation to recognize or transmit information as to the direction of the gyro in that plane. Therefore, the required gain of the directional gyro pick-off signals transmitted to the servo amplifier approaches infinity as the bank angle approaches 90°. At 90°, the pick-off output from the directional gyro becomes absolutely meaningless and has no practical value and at all banking departures from straight and level flight, an error of increasing magnitude exists.

From the foregoing, it can be seen that, in order to properly stabilize an aircraft while executing a turn, it is imperative that we resolve, for transmission to the control surface servo systems, signals which carry sufficient basic information relative to the attitude of the aircraft.

It is therefore a primary object of the present invention to provide an autopilot system comprising position reference means having axes which measure departures of the control axes of an aircraft from corresponding coordinate axes in space and to so resolve the signals which are representative of such departures, that their transmission to the aircraft control servos will effect the correct attitude of the aircraft for all angles of bank.

Another object of the present invention is to provide an automatic pilot in which the directional gyro pick-off axis is maintained in the true vertical in distinction to the usual reference systems in which it is perpendicular to the deck of the craft.

As pointed out above, when the aircraft banks 90°, the conventional pick-off axis becomes horizontal and there is no means in the entire system capable of taking off significant information relative to the heading of the aircraft in azimuth. This is so since the only reference in true azimuth is established by the directional gyro spin axis.

A further object of this invention therefore is to provide an autopilot system in which the gyroscopic reference means comprises a directional gyro mounted on a stabilized platform, which together with vertical gyro means, provide a sufficient measure of departure of the aircraft control axes with respect to the corresponding space axes and which consequently produces signals which can be resolved to correctly stabilize the aircraft under all angles of bank.

Briefly, according to the present invention, my automatic pilot system is provided with stabilized gyroscopic reference units including a directional gyro and a vertical gyro. In contradistinction to conventional autopilot systems, the directional gyro is mounted on a stable platform controlled by the gyro vertical such that the pick-off axis of the directional gyro will not tilt with the aircraft when banking, but will remain in fixed alignment with the vertical to the nadir, and therefore actual azimuthal departures from coordinates axes in space will be measured. A signal representative of this azimuthal departure is then combined in a resolver with a signal representative of the lateral departure about the pitch axis whereby to interchange, according to a cosine and sine function, the rudder and elevator signals transmitted to the respective aircraft control servos.

My invention will be more fully understood by referring now to the accompanying drawing of a diagrammatic representation in perspective of my autopilot system.

Looking now at the drawing, a stable platform 1 is shown as being in the form of a gimbal which is stabilized by gyroscopic reference units as will be hereinafter set forth. This platform has trunnions 2—2 which are pivoted in a bank gimbal 3. The numeral designation of the various trunnions in the drawing may also conveniently serve to identify the various axes about which they rotate. The bank gimbal 3 has trunnions 4—4 which pivot in supports 5—5 mounted on the deck of the aircraft and these trunnions therefore lie parallel to the fore-aft axis of the aircraft as indicated by the arrow.

The position of platform 1 is stabilized, or kept in fixed angular relation with the vertical to the nadir, by servo motors 6, 7 which are driven in accordance with error signals generated by the action of reference gyros 8, 9 respectively carried on the platform 1. These gyros 8, 9 are similar to each other in construction and are illustrated as being of the well known single axis type including electromagnetic torque motors 10, 11 respectively which are subject to the control of suitable pendulous erecting devices 12, 13 respectively carried on the horizontal platform 1. The spin axes of each of these single axis gyros are coaxial with the longitudinal axes of the diagrammatically represented cylinders 8 and 9 respectively, and due to the characteristic gyroscopic property of rigidity, the spin axes tend to maintain their orientation in space. Any departure of the stable platform tending to disturb the orientation of the spin axis of gyro 8, for example, will cause a rotation of pick-off 14 which may be of the usual type which produces a voltage output proportional to its rotation. The voltage output from pick-off 14 is then transmitted to the pitch servo motor 6 which acts to rotate trunnions 2—2 thereby restoring platform 1, and therefore the spin axis of gyro 8, to its initial position.

In a similar manner, any departure of the platform tending to disturb the orientation of the spin axis of gyro 9 will be measured by a pick-off 15 which produces a voltage output defining the angular departure between the platform bank control axis and the gyro spin axis. The voltage output from pick-off 15 is then transmitted to the bank servo motor 7 which acts to rotate trunnions 4—4 thereby restoring bank gimbal 3, and therefore the spin axis of gyro 9, to its initial position.

Although the operating components 8, 10 and 14 are diagrammatically shown as being separate, these elements are, in practice, immersed in a sealed container filled with a fluid which provides viscous restraint. The same is true of components 9, 11 and 15 and further details of their construction may be had by reference to copending application S. N. 114,382, filed September 7, 1949, in the name of F. V. Johnson et al., entitled Gyroscope which application is also assigned to the instant assignee.

Although I have shown two single axis type gyros, those skilled in the art will readily understand that any one of several well known types of double axis vertical gyros, or other types of single axes gyros, may be substituted therefor, the main purpose here being to provide position reference means for stabilizing the platform 1. Also, in a typical arrangement, each of the pendulum erecting devices 12, 13 would comprise the usual pendulum, the movement of which operates the brush of a sensitive potentiometer to supply current to the gyroscope torque motor in one direction or the other depending on the tilt of the platform relative to the pendulums. The precession rate on each gyroscope would be made so small that the platform 1 would assume the horizontal position as determined by the position of the pendulum averaged over a period which is long compared to the duration of disturbances normally affecting the attitude of the aircraft.

Variations in the details of this arrangement may be made without affecting basic functioning. For example the pendulums may be replaced with liquid level detectors, or the potentiometers replaced with electromagnetic pick-offs feeding into amplifiers which supply power to the gyroscope torque motors.

In accordance with usual practice, suitable means (not shown) are provided to disconnect the torque motors electrically during turns or persistent accelerations of the craft. Means may also be provided for introducing additional currents in the torque motors to correct for apparent drift rates of the gyroscopes due to rotation of the earth and speed of the aircraft over the earth, and for the deviation of the bank pendulum due to Coriolis acceleration. Since such means are well known, they are omitted here for the purpose of clarity. If necessary however, reference may be made to Patent No. 2,552,132, issued on May 8, 1951, in the name of Duane F. Anderson, entitled "Torque Applying Means for a Rotating Gimbal Type Gyroscope."

On platform 1 there is carried a directional gyro 16 whose housing has horizontal trunnions 17—17 pivoted in a gimbal 18 which in turn has trunnions 19—19 pivotally mounted in the platform about a vertical axis. While the directional gyroscope 16 may be replaced by a gyroscope of the single axis type having viscous restraint and controlling a servo driven azimuth turntable, I prefer to show the present embodiment primarily for purposes of clarity. In either case, the gyroscopic direction may be set by the usual caging arrangement or by a torque motor 37 mounted on gimbal 18 and adapted to rotate trunnions 17—17 in response to signals from a remotely governed magnetic compass element in accordance with principles well known in the art.

In order to obtain a suitable control signal responsive to displacement of the aircraft about the yaw axis for controlling the rudder so as to maintain a constant heading or course, a transmitter 20 is provided. This transmitter should preferably be of the type known as the selsyn or synchro which has a salient pole rotor excited by a-c, and a three phase stator winding in which the distribution of voltage defines the angular output. Similar transmitters 21 and 22 are mounted on gimbal 3 and support 5 respectively in order to provide a suitable control signal responsive to displacement of the aircraft about the pitch and bank axes respectively.

It is important to note here that the directional gyro pick-off axis is maintained vertical at all times in distinction to prior reference systems wherein the directional gyro pick-off rotates about an axis perpendicular to the deck of the aircraft and therefore tilts out of the true vertical whenever the aircraft banks. With the present system, information on azimuthal departures is always correctly provided for transmission to an appropriate resolution device and remains correct for any banking attitude.

The three transmitters 20, 21 and 22 are connected to three control transformers 23, 24 and 25, respectively, which are quite similar in construction to the transmitter devices, except that in the latter, the rotors are excited, whereas in the control transformers, the rotors are not excited but are manually rotatable for the purpose of introducing control changes. When a transmitter and its control transformer are turned through the same angle, the voltage output of the transformer rotor is zero. However, if the transmitter turns through an additional error angle, the voltage output of the control transformer will be proportional to the error. The manner in which error signals from the control transformers must be combined prior to their application to servo amplifiers may now be formulated from basic principles.

Let $a$, $b$, and $g$ be the attitude angles of the aircraft as set in on the yaw, pitch, and bank control transformers and matched by the outputs of the corresponding pick-offs. Now, let the aircraft be given small rotations so that the yaw, pitch, and bank outputs of the pick-offs change by $da$, $db$, and $dg$. These correspond to rotations $dA$, $dB$, and $dG$ about the mutually perpendicular yaw, pitch and bank control axes fixed to the aircraft. By geometry we find the basic relationships $$dA = +da \cos b \cos g + db \sin g$$
$$dB = -da \cos b \sin g + db \cos g$$
$$dG = +da \sin b + dg$$

Now if the aircraft is controlled about its yaw axis by a rudder servo, and if an error $dA$ occurs in aircraft attitude about that axis, then for good servo operation the error signal returning to the servo should be proportional to $dA$, regardless of the attitude of the aircraft. Thus the above three relations show how the gyro signals $da$, $db$, and $dg$ must be combined to provide the proper $dA$, $dB$, and $dG$ signals to the control surfaces.

For cases where the pitch angle $b$ is not large, these relationships may be simplified to $$dA = +da \cos g + db \sin g$$
$$dB = -da \sin g + db \cos g$$
$$dG = dg$$

Although the present invention is a mechanization which follows from the relationships expressed in the foregoing simplified formulae, it should be clear that the present embodiment may be easily arranged to operate under the basic relationships by utilizing pick-offs to provide appropriate signals and by resolving these signals as indicated in the basic relationships in accordance with principles well understood in the art.

The means by which the signals from the control transformers 23, 24 and 25 are transmitted to actuate the various aircraft control surfaces will now be described.

The horizontal bank gibal 3 which pivots about the fore-aft axis 4—4 will be seen as driving a resolver. The resolver is of conventional construction and is schematically shown as comprising a slotted cylindrical rotor 26 carrying windings 27 and 28 whose principal electrical axes are at right angles, and further comprising a surrounding annular stator having two pairs of commutatively connected windings schematically identified as 29 and 30 which are also disposed electrically at right angles. If desired, the rotor and stator may be considered as being similar in construction to that of a wound rotor induction motor wherein the windings are distributed to give as nearly sinusoidal flux distribution as is feasible.

The stator windings 29 and 30 are connected to the pitch and yaw transformers 24 and 23 respectively, and the rotor windings 27 and 28 are connected to the rudder and elevator servos 32 and 31 respectively.

The signal from the bank control transformer 25 is transmitted directly to the aileron servo 33 and each of the aircraft servos 32, 31 and 33 operate the rudder, elevator, and aileron control surfaces 34, 35 and 36 respectively, in a conventional manner. The devices denoted as servos 31, 32 and 33 include the usual amplifiers, stabilizing networks, and power drives to properly operate the aircraft control surfaces. The basic automatic pilot by means of which the rudder, elevators and ailerons are actuated may be an electric-hydraulic type similar to that shown in Patent 2,416,097, granted to A. Hansen, Jr., et al. on February 18, 1947, and titled "Automatic Pilot."

With the foregoing understanding of the elements and their organization, the operation of my invention will now be readily understood from the following explanation.

Let it be assumed that the bank, pitch, and yaw control transformers are set in a neutral position and that the aircraft is flying a straight and level course. The bank gimbal 3 will be in a horizontal position and parallel to the deck of the aircraft. Now, if displacement of the aircraft occurs about the yaw axis, it will be detected by the directional gyro and the transmitter 20 will transmit a signal via the rudder control transformer 23 to the rudder servo 32 which will then act to operate the rudder control surface 34 so as to restore the aircraft to course. For this condition, it will be noted that the inductive coupling through the resolver is such that none of the yaw signal voltage from control transformer 23 is induced in the winding 28 of the elevator channel, and none of the pitch signal voltage from the control transformer 24 is induced in the winding 27 of the rudder channel.

Now let it be supposed that it is desired to change the attitude of the aircraft so that it will bank slightly to the left. To accomplish this, the human pilot operates bank control transformer 25 to set in the desired banking attitude. When control transformer 25 is operated, a signal is transmitted to the bank servo 33 which acts to displace the ailerons 36 thus banking the aircraft. When the deck of the aircraft banks, this will be detected by the reference gyro 9 which through pick-off 15, will at once call for the operation of bank gimbal servo motor 7 in a direction such as will tend to maintain the traverse axis 2—2 of bank gimbal 3 horizontal. When the deck of the aircraft becomes displaced, the stator coils 29, 30 of the resolver, which are mounted on support 5—5, will move with it, but since the resolver rotor 26 rotates with the trunnions 4—4 of gimbal 3, then the rotor 26 will revolve thus becoming displaced at the bank angle $g$ with respect to the stator coils 29, 30. This means that as the bank angle $g$ increases, the flux induced in winding 28 from winding 30 will vary sinusoidally, and from winding 29 will vary cosinusoidally, while the flux induced in winding 27 from winding 30 will vary cosinusoidally, and from winding 29 will vary sinusoidally.

Let us now assume that it is desired to make a left turn. To accomplish this, the pilot adjusts the yaw transformer 23 and the bank control transformer 25 so that error voltages are transmitted to the resolver stator coil 30 and to the bank servo 33 respectively.

The error voltage from bank control transformer 25, being transmitted directly to bank servo 33, acts to operate the aileron control surfaces 36 thus causing the aircraft to start banking. As soon as banking commences however, it will be detected by the bank gyro 9, and thus the pick-off 15 will at once transmit a signal to the bank gimbal servo motor 7 which will operate to keep the bank gimbal 3 in its horizontal position. Since this is a continuing process, it will be seen that as banking progresses to the desired angle, the transmitter 22 will make a continuing adjustment which, as explained earlier, will reduce the error signal manually set in by bank control transformer 25 so that when the desired banking attitude has been reached, no further error voltage will exist between the transmitter 22 and the control transformer 25 and the aircraft will stop banking.

Returning now to examine the effect of having moved the yaw control transformer 23, it will be seen that initially, the error signal voltage transmitted to resolver stator coil 30 was induced in the resolver rotor winding 27 thus calling for the operation of rudder servo 32 and the displacement of the rudder control surface 34. As the aircraft begins to bank however, the rotor 26 will become progressively displaced with respect to the stator coil 30, and therefore, a progressively lesser voltage will be induced in the winding 27. Although no voltage was induced in winding 28 by coil 30 prior to the bank, it will be seen that, as banking continues, a progressively larger voltage will be induced in winding 28 from coil 30. Consequently, a progressively increasing voltage will be transmitted to the elevator servo 31 thus calling for a correspondingly greater response of the elevator control surfaces. It will be apparent therefore that, without any adjustment of the pitch control transformer 24, a voltage will nevertheless be induced in the winding 28 so as to operate the aircraft elevator control surfaces. It should also be evident that, if the aircraft is banked 90°, a yaw signal transmitted to coil 30 would act to operate the elevator control surface exclusively, and a signal from the yaw control transformer 23 would not operate the rudder. And this is as it should be since, when the aircraft is banked 90°, changes in its pitch attitude should be controlled exclusively by the rudder control surface, and similarly, at a 90° banking attitude, changes in the azimuthal heading of the aircraft can only be effected by operation of the elevator control surfaces.

It is important to note here that, if the aircraft is banked, say at 90°, the platform 1 continues to remain in its stabilized position and thus the directional gyro does not lose its sense of azimuthal heading in space. Thus, any deviation of the aircraft in azimuth will be immediately detected by the transmitter 20, irrespective of the banking attitude of the craft. It will be clear that this is not true of conventional systems in which the directional gyro pick-off moves with the deck of the aircraft in banking and, therefore, in so doing, provides inaccurate information to the yaw signal channel.

In the present invention, since the directional gyro is mounted on a stable platform, the signal produced by yaw transformer 20 is a space yaw signal and represents true azimuth deviations of the aircraft measured about a true vertical axis.

It is believed that the operation of the pitch control transformer 24 will now be obvious from the foregoing discussion. Briefly, when control transformer 24 is operated to call for a change in pitch of the aircraft, an error signal is transmitted to the stator coil 29 thereby inducing a voltage in one or both of the resolver rotor windings 27 and 28, depending upon the bank attitude of the aircraft. Any tendency of the aircraft to be displaced about the pitch axis will be detected at once by the gyro 8 which will then transmit a signal through its pick-off 14 calling for operation of the servo motor 6 to restore the platform 1 to its initial position about the axes of trunnions 2—2. As the aircraft actually changes its attitude about the pitch control axis, the supports 5—5 will carry the bank gimbal 3 with it thus causing the initial voltage set in by control transformer 24 to be gradually offset by the voltage which is produced in pitch transmitter 21 as the gimbal 3 and the platform 1 change their relative angular position about their common axis 2—2. Thus, when the aircraft has reached the desired attitude about its pitch control axis, no further voltage will be transmitted to the resolver stator coil 29.

Again, it should be noted that, since the platform 1 is stabilized in space, the signal produced by pitch transformer 21 is a space pitch signal and represents true pitch deviations of the aircraft measured about a true horizontal axis.

As shown in the drawing, the control transformers 23, 24 and 25 each act independently and the manual adjustment of any of these separate devices may be made without reference to the other two. However, it is common practice for the pilot, when making a turn, for example, to call for the operation of the aircraft rudder control surface as well as the aileron control surfaces. It will be understood therefore, that the operation of the three control transformers will normally be coordinated either manually or automatically so that when the aircraft banks or goes through other maneuvers, it will make a so called "ball-center" turn. On the other hand, the pitch control transformer 24 may be used alone to compensate for nose heaviness during a turn.

It may be found that some relationship of the mixed yaw and pitch signals other than the sine and cosine functions of the angle of bank may be required with certain types of aircraft, depending upon their aerodynamic response characteristics. However, if it is desired to change the relationship of the mixed signals, this can be accomplished by varying the physical relationship of the windings on the resolver rotor, or an equivalent result can be obtained by driving the rotor 26 in accordance with some non-linear function of the angle of bank.

While a particular embodiment of my invention has been illustrated and described, modifications thereof will readily occur to those skilled in the art. It should be understood therefore that the invention is not limited to the particular arrangement disclosed but that the appended claims are intended to cover all modifications which do not depart from the true spirit and scope of my invention.

What I claim as new and desire to secure by Letters Patent of the United States is:

1. In a control system for an aircraft having a pair of mutually perpendicular movable control surfaces, separate actuating means for positioning said surfaces, a platform adapted to be pivotally mounted upon said aircraft, means for maintaining said platform in fixed angular relation with the vertical to the nadir, means mounted upon said platform for generating first and second control signals each proportional respectively to the angular displacement of said aircraft about said vertical and about an axis transverse thereto, said signals being independent of the angular disposition of said aircraft about its longitudinal axis, and means associated with said aircraft and platform and responsive to the relative angular deviation therebetween about said longitudinal axis for directing a portion of each said control signal to energize both actuating means, the first signal energizing a first actuating means in accordance with the cosine function of said relative deviation and the other said actuating means in accordance with the sine function thereof, and the second signal energizing the first actuating means in accordance with the sine function of said relative deviation and the other said actuating means in accordance with the cosine function thereof.

2. In a control system for an aircraft having a pair of mutually perpendicular control surfaces, separate actuating means for positioning said surfaces, a platform adapted to be mounted upon said aircraft for pivotal movement about two perpendicular axes, gyro operated means for stabilizing said platform in a fixed angular relation with the vertical to the nadir, attitude responsive means mounted upon said platform for developing an absolute yaw signal proportional to angular displacement of said aircraft about said vertical, control means associated with said platform for developing an absolute pitch signal proportional to angular position of said aircraft about a space pitch axis perpendicular to said vertical, and control means responsive to relative bank of said aircraft referenced to said platform for energizing both actuating means by portions of both signals in inverse angular functional relation in accordance with the angle of displacement of said aircraft about its bank axis.

3. In a control system for an aircraft having a rudder and an elevator, separate actuating means for positioning said rudder and elevator, a stable platform adapted to be mounted upon said aircraft for pivotal movement about two mutually perpendicular axes, gyro operated means for maintaining said platform in fixed angular relation with the vertical to the nadir, attitude responsive means mounted upon said platform for developing an absolute yaw signal proportional to the angular displacement of the aircraft about said vertical, control means associated with said platform for developing an absolute pitch signal proportional to the angular displacement of said aircraft about a space pitch axis perpendicular to the vertical, resolving means for electrically interconnecting said yaw signal to energize said rudder positioning means and said elevator positioning means and for electrically interconnecting said pitch control signal to energize said rudder positioning means and said elevator positioning means, said resolving means adapted to be associated with said platform and aircraft and being responsive to relative angular displacement therebetween about the longitudinal axis of the aircraft for oppositely apportioning said above energizing signals in accordance with the sine and cosine of said relative angular displacement.

4. In an automatic pilot for an aircraft having a rudder and elevator for controlling angular movement of said aircraft about mutually perpendicular yaw and pitch axes fixed relative to said aircraft, means defining an absolute yaw axis in space, means associated with said defining means to generate a control signal proportional to displacement of the aircraft about said space yaw axis, said yaw axis in space and said yaw axis fixed relative to said aircraft being in alignment in level flight but becoming angularly displaced when said aircraft is banked, actuating means for positioning said rudder, actuating means for positioning said elevator, and coupling means associated with said defining means and connected to supply said control signal to energize said actuators in accordance with the cosine and sine functions of the angle of bank of said aircraft.

5. In a control system for aircraft, first electro-responsive means connected to control movement of said craft about a yaw axis fixed relative to said aircraft, second electro-responsive means for controlling movement of said craft about a pitch control axis fixed relative to said aircraft, means defining space yaw, space pitch, and space bank axes fixedly aligned with the vertical to the nadir irrespective of aircraft attitude, first signal generating means associated with said defining means and responsive to deviation of said aircraft about said space yaw axis, second signal generating means associated with said defining means and responsive to deviation of said aircraft about said space pitch axis, and means additionally associated with said defining means and responsive to said first and second signals to supply different angular functions of said first and second signals to both of said electro-responsive means in accordance with the angular disposition of said aircraft about its longitudinal axis.

6. In an autopilot for an aircraft having a rudder and an elevator, separate means for positioning said rudder and elevator, a bank gimbal mounted upon said aircraft to pivot about the bank control axis thereof, a platform mounted on said gimbal to pivot about an axis normal to said bank axis, gyro operated control means connected to maintain said platform in fixed angular relation with the vertical to the nadir, directional gyro means mounted upon said platform, a signal transmitter on the pickoff axis of said directional gyro, a signal transmitter on the pivot axis of said platform, and means associated with said bank gimbal and connected to energize each of said positioning means by each of said transmitters in inverse angular functional relation in proportion to the angular disposition of said aircraft about said bank axis.

7. In a control system for aircraft, first means connected to control movement of said craft about a yaw axis fixed relative to said aircraft, second means for controlling movement of said craft about a pitch axis fixed relative to said aircraft, means defining a space yaw axis aligned with the vertical to the nadir, a pitch axis, and bank axis perpendicular thereto, first signal generating means responsive to deviation of said aircraft about said space paw axis irrespective of the angle of bank of said aircraft, second signal generating means responsive to deviation of said aircraft about said pitch axis, and means responsive to deviation of said aircraft about said bank axis and connected to supply different angular functions of the signals from both said signal generating means to each said control means in accordance with said aircraft bank deviation.

8. In an autopilot for an aircraft having a rudder and an elevator, separate means for positioning said rudder and elevator, a bank gimbal adapted to be mounted upon said aircraft to pivot about the bank axis thereof, a platform mounted on said gimbal to pivot about an axis normal to said bank axis, attitude responsive means connected to maintain said platform in fixed angular relation with the vertical to the nadir, yaw responsive means mounted upon said platform, a signal transmitter responsive to said yaw means, a signal transmitter on the pivot axis of said platform, and means responsive to movement of said bank gimbal and connected to energize each of said positioning means by both of said signal transmitter means in inverse angular functional relation proportional to the angular disposition of said aircraft above said bank axis.

9. In an autopilot for an aircraft having two control surfaces, separate actuators for positioning said control surfaces, a structure adapted to be pivotally associated with said aircraft with respect to the bank and pitch axes thereof, means for stabilizing said structure to remain in fixed angular relation with the vertical to the nadir and thereby defining predetermined bank and pitch axes in space irrespective of aircraft attitude, a yaw deviation responsive device supported by said structure to thereby define a predetermined yaw axis in space irrespective of aircraft attitude, a first signal generator associated with said structure and stabilizing means to generate pitch signals in response to deviation of the aircraft about said predetermined pitch axis, a second signal generator associated with said yaw deviation responsive device to generate yaw signals in response to deviation of the aircraft about said predetermined yaw axis, and coupling means for directing portions of both said signals to energize both actuators, said coupling means being associated with said structure and responsive to relative pivotal deviation of the aircraft about the bank axis with respect thereto to apportion these signals in accordance with said relative deviation.

References Cited in the file of this patent

UNITED STATES PATENTS

| 1,731,776 | Henry | Oct. 15, 1929 |
| 1,869,840 | Boykow | Aug. 2, 1932 |
| 2,307,941 | Meredith | Jan. 12, 1943 |
| 2,478,956 | Webber | Aug. 16, 1949 |
| 2,513,738 | Noxon | July 4, 1950 |
| 2,517,612 | Varian | Aug. 8, 1950 |
| 2,571,106 | Brannin | Oct. 16, 1951 |
| 2,623,714 | Slater | Dec. 30, 1952 |
| 2,649,264 | Slater et al. | Aug. 18, 1953 |

FOREIGN PATENTS

| 611,016 | Great Britain | Oct. 25, 1948 |
| 621,121 | Great Britain | Apr. 5, 1949 |